United States Patent
Teshima et al.

(10) Patent No.: US 9,599,222 B2
(45) Date of Patent: Mar. 21, 2017

(54) DIAPHRAGM PUMP

(71) Applicant: Nippon Pillar Packing Co., Ltd., Osaka-shi, Osaka (JP)

(72) Inventors: Kazukiyo Teshima, Fukuchiyama (JP); Mitsuo Mori, Fukuchiyama (JP); Motoaki Naruo, Fukuchiyama (JP)

(73) Assignee: NIPPON PILLAR PACKING CO., LTD., Osaka-Shi (JP)

( * ) Notice: Subject to any disclaimer, the term of this patent is extended or adjusted under 35 U.S.C. 154(b) by 395 days.

(21) Appl. No.: 14/355,016

(22) PCT Filed: Sep. 26, 2012

(86) PCT No.: PCT/JP2012/074708
§ 371 (c)(1),
(2) Date: Apr. 29, 2014

(87) PCT Pub. No.: WO2013/065423
PCT Pub. Date: May 10, 2013

(65) Prior Publication Data
US 2015/0300491 A1 Oct. 22, 2015

(30) Foreign Application Priority Data
Nov. 1, 2011 (JP) ................. 2011-240280

(51) Int. Cl.
*F16J 3/00* (2006.01)
*F16J 3/02* (2006.01)
(Continued)

(52) U.S. Cl.
CPC ............. *F16J 3/02* (2013.01); *F04B 43/0054* (2013.01); *F04B 43/0063* (2013.01); *F04B 43/02* (2013.01); *F04B 43/04* (2013.01)

(58) Field of Classification Search
CPC .............. F04B 43/02; F04B 43/04; F16J 3/02
(Continued)

(56) References Cited

U.S. PATENT DOCUMENTS 4,056,043 A * 11/1977 Sriramamurty ......... F15B 15/02
92/98 D
7,293,967 B2 * 11/2007 Fukano ................... F04B 43/04
92/98 D
(Continued)

FOREIGN PATENT DOCUMENTS

JP 62-179378 11/1987
JP S62179378 11/1987
(Continued)

OTHER PUBLICATIONS

European Search Report dated Jul. 10, 2015, 3 pages.

*Primary Examiner* — Michael Leslie
(74) *Attorney, Agent, or Firm* — Rankin, Hill & Clark LLP

(57) ABSTRACT

In a diaphragm pump having a fluorine resin-made rolling diaphragm including: an inner circumferential portion that elongates along an outer circumferential surface of a piston; an outer circumferential portion that elongates along the inner circumferential surface of a cylinder; and a folded portion that is formed by folding back in a tubular space between the cylinder and the piston; and a pump chamber is separated by the rolling diaphragm in the cylinder, the rolling diaphragm is produced in an extended attitude corresponding to an attitude obtained when, by a projective movement of the piston, the outer circumferential portion is eliminated, and the folding of the folded portion is opened.

3 Claims, 14 Drawing Sheets

(51) Int. Cl.
  *F04B 43/00* (2006.01)
  *F04B 43/02* (2006.01)
  *F04B 43/04* (2006.01)
(58) Field of Classification Search
  USPC ........................................................ 92/98 D
  See application file for complete search history.

(56) References Cited

U.S. PATENT DOCUMENTS 7,614,338 B2 * 11/2009 Uehara .................. F04B 43/02
  92/98 D
2007/0240564 A1 10/2007 Uehara et al.

FOREIGN PATENT DOCUMENTS

| JP | 9-53566 | 2/1997 |
| JP | H0953566 | 2/1997 |
| JP | 2003-096254 | 4/2003 |
| JP | 2010-019141 | 1/2010 |
| JP | 2010-106674 | 5/2010 |
| JP | 2010-144616 | 7/2010 |

* cited by examiner

DIAPHRAGM PUMP

TECHNICAL FIELD

The present invention relates to a diaphragm pump including a rolling diaphragm, and more specifically to a diaphragm pump which is suitably used in application of a chemical liquid or blending of chemical liquids in a process of producing a semiconductor, a liquid crystal, an organic EL, a solar cell, an LED, or the like.

As a diaphragm pump of this kind, known is a pump apparatus (rolling diaphragm pump) disclosed in Patent Literature 1. The rolling diaphragm pump is configured by having:

a cylinder;
a piston;
a rolling diaphragm;
a pump chamber which is separated by the rolling diaphragm in the cylinder, and the volume of which is changed by a movement of the piston; and,
a decompression chamber which, in the back side of the rolling diaphragm, is formed while being surrounded by the cylinder, the piston, and the rolling diaphragm.

The rolling diaphragm has an inner circumferential portion which is supported by the piston, and an outer circumferential portion which is supported by the cylinder through a folded portion of the outer circumference of the piston.

In such a diaphragm pump, in a usual driving mode, a pumping operation of sucking and ejecting a fluid is performed by a reciprocal movement between a suction position (see FIG. 3 of Patent Literature 1 above) where the piston is mostly retractively moved, and an ejection position (see FIG. 4 of Patent Literature 1 above) where the piston is projectively moved.

In a diaphragm pump, in a liquid replacement in which liquids such as chemical liquids are replaced, an operation which is called the flushing mode is sometimes conducted. In the flushing mode, in order to completely discharge the liquid in the pump chamber, the piston is moved toward the projection side as far as possible, or projectively moved to the maximum projecting position.

In the flushing mode, the piston is maximally projectively moved to the maximum projecting position, and therefore the folded portion which is formed in the tip end side of the rolling diaphragm is changed from a folded attitude (bent attitude) having a U-like sectional shape to an extended attitude in which the portion is elongated and extended. Therefore, a liquid stagnating in the folded portion is moved toward the pump chamber to be easily discharged, and the liquid replacement can be smoothly performed.

In an actual flushing mode, in order to perform a chemical liquid replacement (exchange), however, a cleaning liquid or a chemical liquid which is to be loaded for replacement is required in a quantity which is larger than expected, and a long time period is taken, thereby causing a problem in that an efficient liquid replacement which is smoothly performed for a short time period cannot be conducted.

The cause of the above has been investigated, and it has been found that the following phenomenon occurs. In the phenomenon, when the piston is projectively moved to the maximum projecting position, as shown in FIG. 14, a curved portion 10 which should be in a smooth extended attitude is partially reversely bent to form an edge portion 41 or a reversely bent portion 42 [see FIG. 14(a)], or an undulated portion 43 having a swollen shape is formed in the root side of an inner circumferential portion 3c which should have a straight tubular shape [see FIG. 14(b)].

Namely, it has been found that, in the rolling diaphragm 3, the curved portion 10 which should be smoothly arcuately deformed to be in an extended attitude by extending (opening) the folded portion 3d and the like has a distorted shape. The curved portion 10 means a portion which, when the rolling diaphragm 3 is in an extended attitude as shown in FIG. 14, connects the inner circumferential portion 3c with an outer circumferential portion 3g. When the curved portion 10 is curved without distortion to form a portion smoothly connecting the inner circumferential portion 3c with the outer circumferential portion 3g as shown in FIG. 2, the curved portion has the expected (normal) shape.

When the piston is at the maximum projecting position, as described above, the curved portion 10 is not in an extended attitude having the expected smooth curved shape (see FIG. 2), and actually has a distorted shape as shown in FIGS. 14(a), (b), and therefore a situation where a liquid in the folded portion 3d is hardly discharged from the pump chamber occurs. As described above, in order to perform a complete liquid replacement, therefore, a large quantity of a cleaning liquid or a chemical liquid which is to be loaded for replacement, and a long time period are required.

Moreover, a case where the liquid in the folded portion is not sufficiently discharged and stagnates therein to aggregate may sometimes occur. In such a case, there is a fear that a product failure or reduction of the product yield may be caused. An example of a product failure is a case where an aggregated liquid in a process of producing a semiconductor is formed as a stagnant foreign material, and there arises a possibility that a wafer defect may occur.

PRIOR ART LITERATURE

Patent Literature

Patent Literature 1: Japanese Patent Application Laid-Open No. 2010-019141

SUMMARY OF THE INVENTION

Problems to be Solved by the Invention

It is an object of the invention to provide a diaphragm pump in which, when a rolling diaphragm is set to an extended attitude by projectively moving a piston as far as possible, a curved portion that is formed by opening a folded portion does not have a distorted shape, but has an expected shape that is smoothly curved, whereby the liquid quantity and time period that are required for a liquid replacement in a flushing mode can be reduced, and the liquid replacement efficiency is improved.

Means for Solving the Problems

The invention of claim 1 is a diaphragm pump having: a rolling diaphragm 3 including: an inner circumferential portion 3c which is supported by a piston 2 that is reciprocally movable in a cylinder 1, and which elongates along an outer circumferential surface 2e of the piston 2; an outer circumferential portion 3e which is supported by the cylinder 1, and which elongates along an inner circumferential surface 1r of the cylinder 1; and a folded portion 3d which is formed by folding back in a tubular space 13 between the cylinder 1 and the piston 2, to extend from the inner circumferential portion 3c to the outer circumferential portion 3e, the rolling diaphragm being made of a flexible material; and a pump chamber 4 which is separated by the rolling diaphragm 3 in the cylinder 1, and a volume of which is changed in a manner that the volume is reduced by a projective movement of the piston 2, and the volume is increased by a retractive movement of the piston 2, characterized in that the rolling diaphragm 3 is produced in an extended attitude corresponding to an attitude obtained when, by a projective movement of the piston 2, the outer circumferential portion 3e is eliminated, and a folding of the folded portion 3d is opened.

The invention of claim 2 is characterized in that, in the diaphragm pump of claim 1, the rolling diaphragm 3 is set to a state in which, when the piston 2 is at a maximum projecting position f where the piston is mostly projectively moved, the extended attitude is obtained, and the piston 2 is configured to be reciprocally movable between the maximum projecting position f and a suction position k where the retractive movement is performed from the maximum projecting position f.

The invention of claim 3 is characterized in that, in the diaphragm pump of claim 2, the piston 2 is configured to be reciprocally movable between an ejection position t where the retractive movement is performed from the maximum projecting position f, and where the projective movement is performed from the suction position k, and the suction position k, and, when the piston 2 is at the ejection position t and on a side of the suction position k with respect to the ejection position, the rolling diaphragm 3 is maintained in a folded attitude having the folded portion 3d.

The invention of claim 4 is characterized in that, in the diaphragm pump of claim 1, the cylinder 1 has: a cylinder body 1A in which the piston 2 is accommodated in a reciprocally movable manner; and a cylinder head 1B including supply/ejection paths 6a, 7a for the pump chamber 4, the rolling diaphragm 3 includes a thick outer circumference ring portion 3g which is continuous with a tip end side of the outer circumferential portion 3e, and the cylinder body 1A and the cylinder head 1B are coupled and integrated with each other while interposing the outer circumference ring portion 3g between the both components 1A, 1B.

The invention of claim 5 is characterized in that, in the diaphragm pump of claim 4, the rolling diaphragm 3 has a configuration where a thin-film annular extraction portion 3f which extends in an inner radial direction from an inner circumferential end of the outer circumference ring portion 3g is connected to the outer circumferential portion 3e.

Effects of the Invention

According to the invention of claim 1, the rolling diaphragm 3 is produced in the extended attitude (see FIGS. 2 and 5). Even when the piston 2 is at any position within the reciprocal movement range, therefore, the folded portion 3d is maintained in a state where an attitude change (shape change) between a folded attitude (bent attitude) and the extended attitude is smoothly performed.

When the piston 2 is projectively moved to form the extended attitude, the curved portion 10 which is formed by the movement is not formed into a distorted shape such as shown in FIG. 14, and the rolling diaphragm 3 having an expected extended attitude having the curved portion 10 which smoothly connects the inner circumferential portion 3c with the outer circumference ring portion 3g is obtained. Therefore, elements (the edge portion 41, the reversely bent portion 42, the undulated portion 43, and the like) which block a liquid stagnating in the folded portion 3d from flowing in the projective movement direction are not formed, and discharging can be smoothly conducted.

As a result, it is possible to provide a diaphragm pump P in which, when the rolling diaphragm 3 is caused to have the extended attitude by projectively moving the piston 2 as far as possible, the curved portion 10 which is formed by opening of the folded portion 3d is not formed into a distorted shape, but has the expected shape that is smoothly curved, the liquid quantity and time period that are required for a liquid replacement in the flushing mode can be reduced, and the liquid replacement efficiency is improved.

According to the invention of claim 2, the piston 2 can be reciprocally moved between the maximum projecting position f where the rolling diaphragm 3 has the extended attitude, and the suction position k where the rolling diaphragm has the folded attitude. By the above-described function, therefore, the cleaning efficiency and liquid replacement efficiency in a liquid replacement can be improved, and furthermore a trouble due to a liquid stagnation phenomenon in a liquid transfer can be suppressed.

According to the invention of claim 3, the piston 2 can be reciprocally moved also between the ejection position t and suction position k in both of which the rolling diaphragm 3 has the folded attitude, and, in a liquid replacement, the piston 2 can be reciprocally moved between the maximum projecting position f and the suction position k (operated in the flushing mode), and, in a liquid transfer, reciprocally moved between the ejection position t and the suction position k (operated in the normal mode).

In the normal mode, pumping operations are performed in a state where the folded attitude in which the folded portion 3d is formed in the rolling diaphragm 3 is maintained, and the sectional shape of the rolling diaphragm 3 (particularly, the film-like portion) is maintained constant. Therefore, the flow quantity of the liquid which is transferred in each of the pumping operations can be kept constant.

According to the invention of claim 4, the outer circumference ring portion 3g of the rolling diaphragm 3 can be supported by the structure of coupling the cylinder body 1A and cylinder head 1B which are components of the cylinder 1. Therefore, it is possible to provide the diaphragm pump P having a more rational structure.

As in claim 5, when the configuration is employed where the thin-film annular extraction portion 3f which extends in an inner radial direction from the inner circumferential end of the circumference ring portion 3g is connected to the outer circumferential portion 3e, the shape change in a thin film portion u between the folded portion 3d and the curved portion 10 is performed more gently, and there is an advantage that both the folded attitude and the extended attitude can be stably formed.

BEST MODE FOR CARRYING OUT THE INVENTION

Hereinafter, embodiments of the diaphragm pump of the invention will be described with reference to the drawings.

Embodiment 1

Figure 1:
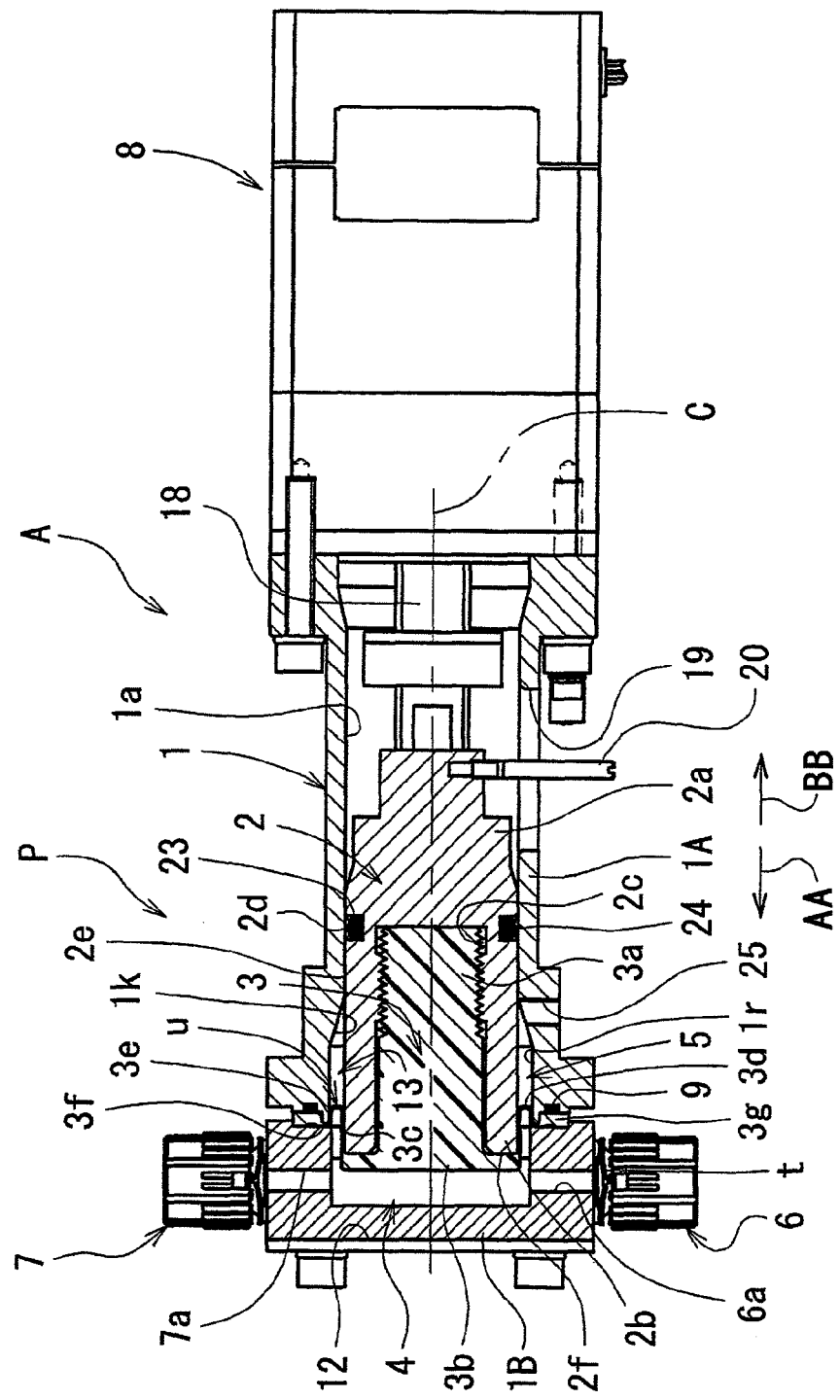
FIG. 1 is a partially cutaway side view showing the structure of a diaphragm pump.
Figure 12:
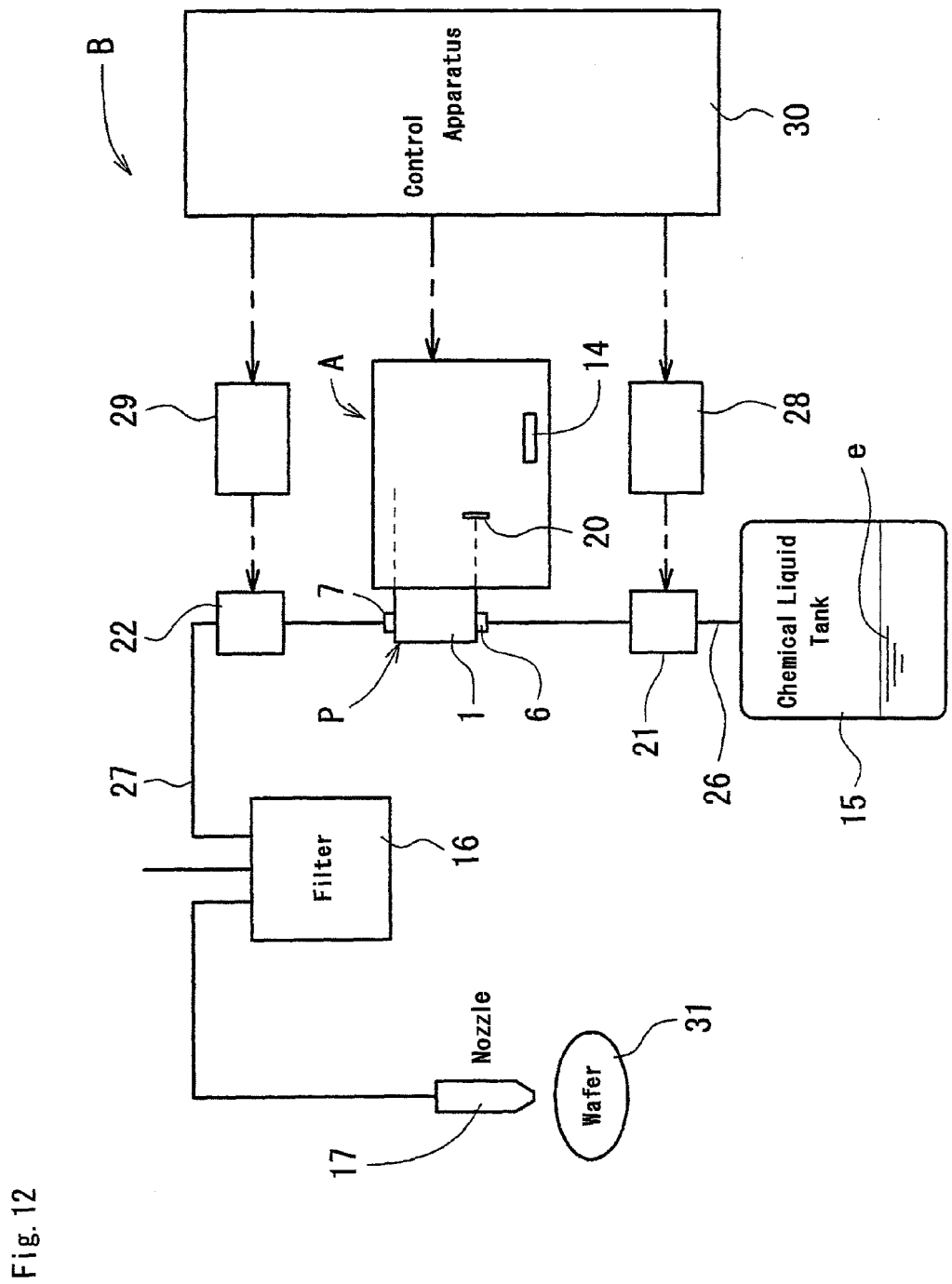
FIG. 12 is a diagram showing a liquid pump system using the diaphragm pump.

FIG. 1 shows a diaphragm pump P and a pump apparatus A having it, and FIG. 12 shows a liquid pump system B including the pump apparatus A. The pump apparatus A is configured by including the diaphragm pump (also called a rolling diaphragm pump) P, a linear actuator (motor) 8 which drives the diaphragm pump P, etc. The internal structure of the linear actuator 8 is known (Patent Literature 1 above and the like), and its detailed description and illustration are omitted.

The reference numeral 20 denotes an engagement pin for detecting the piston position, and 25 denotes an aspiration port which is connected to an aspirator (pressure reducing unit) 14 (see FIG. 12). In the pump apparatus A, the piston 2 which can be reciprocally moved in the cylinder 1 is reciprocally driven in the direction of the axis C by the linear actuator 8, whereby a liquid can be sucked through a suction port 6 and then ejected through an ejection port 7. FIG. 1 shows a state where the piston 2 is located at the ejection position t.

The liquid pump system B is configured by having a chemical liquid tank 15, the pump apparatus A, a filter 16, a nozzle 17, an opening/closing valve 21 of the suction side, an opening/closing valve 22 of the ejection side, a suction side flow path 26, an ejection side flow path 27, etc. The opening/closing valve 21 of the suction side is placed in the middle of the suction side flow path 26 which elongates between the suction port 6 of the pump apparatus A and the chemical liquid tank 15, and the opening/closing valve 22 of the ejection side and the filter 16 are placed in the ejection side flow path 27 which elongates between the ejection port 7 of the pump apparatus A and the nozzle 17.

Moreover, a control apparatus 30 is disposed which governs driving states of a suction side driving mechanism 28 that drives the opening/closing of the opening/closing valve 21 of the suction side, an ejection side driving mechanism 29 that drives the opening/closing of the opening/closing valve 22 of the ejection side, and the pump apparatus A. The reference numeral 31 denotes a wafer which is a target (target of liquid supply) of application of a liquid e such as a chemical liquid.

Figure 3:
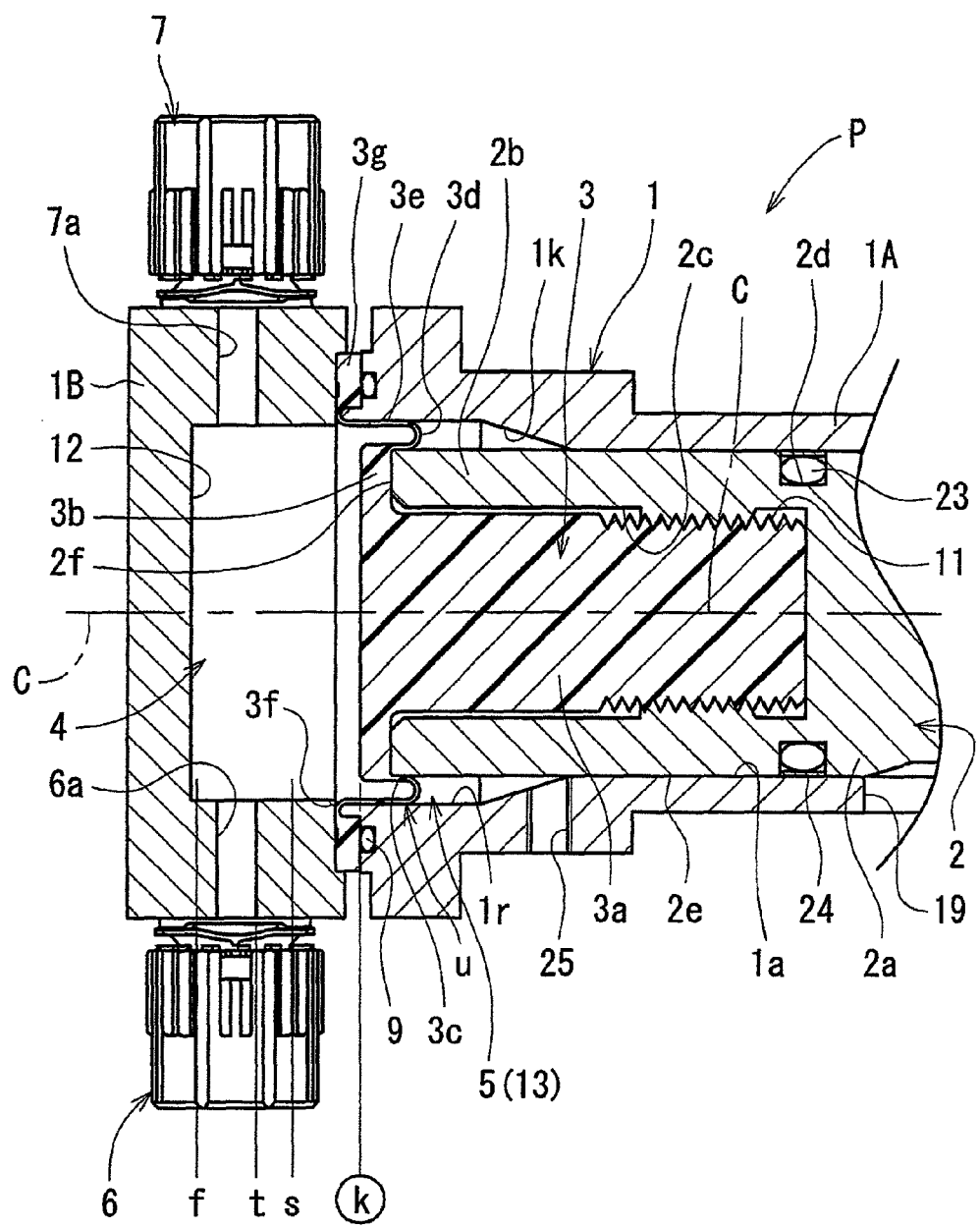
FIG. 3 is a sectional view of main portions of the pump in which a piston is at a suction position.
Figure 4:
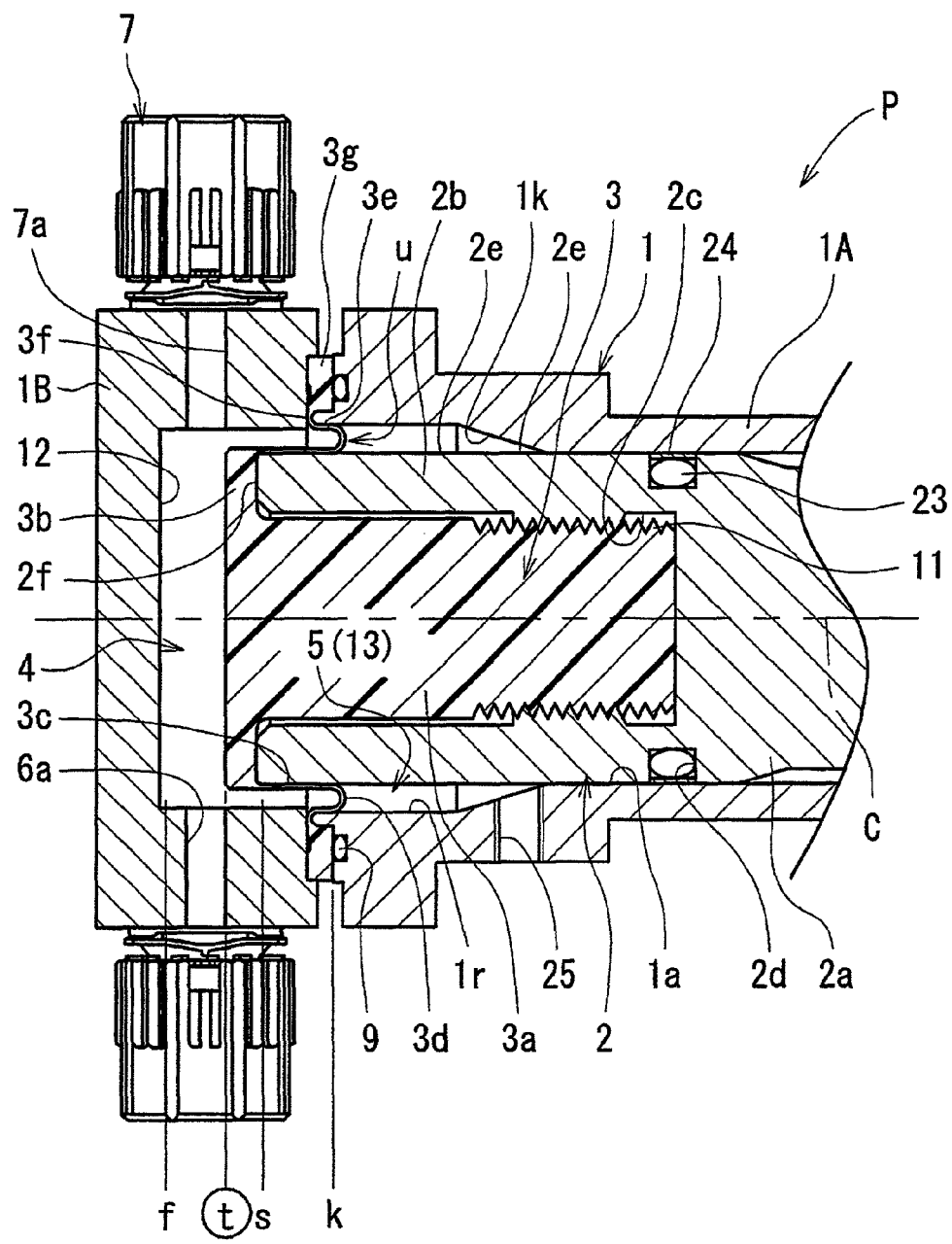
FIG. 4 is a sectional view of main portions of the pump in which the piston is at an ejection position.

As shown in FIGS. 1 and 3, the diaphragm pump P is configured by including: the cylinder 1; the piston 2 which is accommodated in the cylinder 1 in a reciprocally movable manner; a rolling diaphragm 3 which is equipped between the cylinder 1 and the piston 2; a pump chamber 4 which is separated by the rolling diaphragm 3 in the cylinder 1; the suction port 6 and ejection port 7 which are formed in the cylinder 1; etc.

The piston 2 is accommodated in the cylinder 1 so as to be slidably movable in the direction of the axis C, and interlockingly coupled to the linear actuator 8 via an output screw shaft 18. The volume of the pump chamber 4 is reduced by projectively moving the piston 2 in the direction of the arrow AA, and that of the pump chamber 4 is increased by retractively moving the piston 2 in the direction of the arrow BB. Next, the portions will be described.

As shown in FIGS. 1 and 3 to 5, the cylinder 1 is configured by including a cylinder body 1A which is bolted to the linear actuator 8, and a cylinder head 1B which is bolted to the cylinder body 1A through an outer circumference ring portion 3g of the rolling diaphragm 3.

The cylinder body 1A has: a cylinder inner circumferential surface 1a having a circular sectional shape; a rolling inner circumferential surface (an example of "inner circumferential surface of the cylinder") 1r having a circular sectional shape in which the diameter and the sectional area are larger than those of the cylinder inner circumferential surface 1a, and formed on the projection side of the cylinder inner circumferential surface 1a; and an inclined inner circumferential surface 1k which connects the cylinder inner circumferential surface 1a with the rolling inner circumferential surface 1r. The cylinder inner circumferential surface 1a and the rolling inner circumferential surface 1r have the common axis C.

In the cylinder body 1A, a long hole 19 through which the engagement pin 20 that is moved integrally with the piston 2 is to be passed is open formed, and the aspiration port 25 that is opened in the inclined inner circumferential surface 1k is formed. The cylinder head 1B includes a suction path (an example of supply/ejection paths) 6a which is opened in the pump chamber 4, and which communicates with the suction port 6, and an ejection path (an example of supply/ejection paths) 7a which is opened in the pump chamber 4, and which communicates with the ejection port 7. The suction path 6a and the ejection path 7a are set as linear pipe conduits which are identical with each other in position in the direction of the axis C and diameter. Although both the suction port 6 and the ejection port 7 are described as those having a pipe joint structure, they are not limited to the configuration.

As shown in FIGS. 1 and 3 to 5, the piston 2 is configured as a straight drum shape which has: an annular packing groove 2d that is formed in a middle portion in the movement direction (direction of the axis C) of the piston; a tip end portion 2b that is on the side of the cylinder head 1B with respect to the groove; a basal end portion 2a that is in the opposite side or on the piston root side; a screw hole 2c that is formed in the tip end portion 2b; and the like, and which is fitted into the cylinder inner circumferential surface 1a.

An O-ring 23 made of fluorine rubber or the like, and a slipper ring 24 which is made of a fluorine resin such as polytetrafluoroethylene (PTFE), and which is placed on the outer circumferential side of the O-ring 23 are disposed in the packing groove 2d. The above-described engagement pin 20 stands from the basal end portion 2a.

As shown in FIGS. 1 to 5, the rolling diaphragm 3 is made of a fluorine resin such as PTFE (polytetrafluoroethylene), and is configured by having the screw shaft portion 3a, the flange head portion 3b, the thin inner circumferential portion 3c, the folded portion 3d, the thin outer circumferential portion 3e, the thin-film annular extraction portion 3f, and the outer circumference ring portion 3g.

The screw shaft portion 3a is a columnar portion which is to be inserted into the screw hole 2c of the piston 2, and the flange head portion 3b is formed in the tip end of the screw shaft portion. The thin inner circumferential portion 3c is a thin cylindrical portion which is extended toward the root side of the piston 2 in a state where it elongates from an outer end portion of the flange head portion 3b along the outer circumferential surface 2e of the piston 2.

The outer circumference ring portion 3g which is thick in the direction of the axis C is formed in the outermost circumferential side of the rolling diaphragm 3, and the thin-film annular extraction portion 3f is extended in an inner radial direction from the inner circumferential end of the outer circumference ring portion 3g. The thin outer circumferential portion 3e which is formed in succession to the extraction portion 3f is a thin cylindrical portion which is extended toward the root side of the piston 2 in a state where it elongates along the rolling inner circumferential surface 1r.

The end of the thin inner circumferential portion 3c on the side of the root of the piston 2, and that of thin outer circumferential portion 3e on the side of the root of the piston 2 are integrated with each other through the thin folded portion 3d which is folded back in a tubular space 13 between the cylinder 1 and the piston 2. The sectional shape of the folded portion 3d has a U-like shape which is convex toward the root side of the piston 2. A known structure is employed in which, when the formation position of the folded portion 3d is moved in the direction of the axis C in conjunction with the movement of the piston 2, the rolling diaphragm 3 is smoothly deformed to maintain the air tightness (liquid tightness) of the pump chamber 4 that undergoes a volumetric change.

When the screw shaft portion 3a is inserted into and screwed with the screw hole 2c, the rolling diaphragm 3 can be attached to the piston 2 in a state where an outer circumferential portion of the flange head portion 3b butts against an annular tip end surface 2f of the piston 2, and the thin inner circumferential portion 3c is closely fitted onto the tip end portion 2b. Moreover, the outer circumference ring portion 3g is integrally attached to the cylinder 1 in a state where it is pressingly held between the cylinder body 1A and the cylinder head 1B.

As a result, in a state where the diaphragm pump P is assembled, as shown in FIG. 1, the pump chamber 4 is a space portion surrounded by the cylinder head 1B and the rolling diaphragm 3, and a ring-like decompression chamber 5 which is surrounded by the rolling diaphragm 3, the piston 2, and the cylinder body 1A, and which communicates with the aspiration port 25 is formed on the side of the back surface (the root side of the piston 2) of the rolling diaphragm 3.

An O-ring 9 made of fluorine rubber or the like is disposed between the joining surfaces of the cylinder body 1A and the outer circumference ring portion 3g. The gap between the joining surfaces of the cylinder head 1B and the outer circumference ring portion 3g is sealed by pressing a lip seal portion (not shown) formed in the cylinder head 1B, against the surface of the outer circumference ring portion 3g.

FIGS. 3, 6(b), 8(b), and 10(a) show main portions of the diaphragm pump P in the case where the piston 2 is at a position where it is moved at the maximum degree to the root side of the piston 2 (on the side of the linear actuator 8), i.e., a suction position k, and a state where the tip end of the flange head portion 3b is substantially flush with that of the cylinder body 1A in the direction of the axis C is set. When the piston 2 is at the suction position k, the thin outer circumferential portion 3e which elongates along the rolling inner circumferential surface 1r has a relatively long length in the direction of the axis C, and the thin inner circumferential portion 3c which elongates along the outer circumferential surface 2e has a relatively short length in the direction of the axis C.

The suction position k is not always necessary to be a position where the piston 2 is moved at the maximum degree to the root side of the piston 2, and may be a position in front of it.

FIGS. 1, 4, 6(a), 7(a), 8(a), and 9(a) show the piston 2 in the case where it is at an ejection position t which is separated to some extent from the suction position k in the direction of the arrow AA. Here, the ejection position t is set to a position where the tip end of the flange head portion 3b reaches the peripheral edges of the opening holes of the suction path 6a and ejection path 7a which are formed in the pump chamber 4, on the side of the root of the piston 2 in the direction of the axis C.

When the piston 2 is at the ejection position t, the thin outer circumferential portion 3e which elongates along the rolling inner circumferential surface 1r has a relatively short length in the direction of the axis C (shorter than that in the case of the suction position k), and the thin inner circumferential portion 3c which elongates along the outer circumferential surface 2e has a relatively long length in the direction of the axis C (longer than the in the case of the suction position k).

Figure 5:
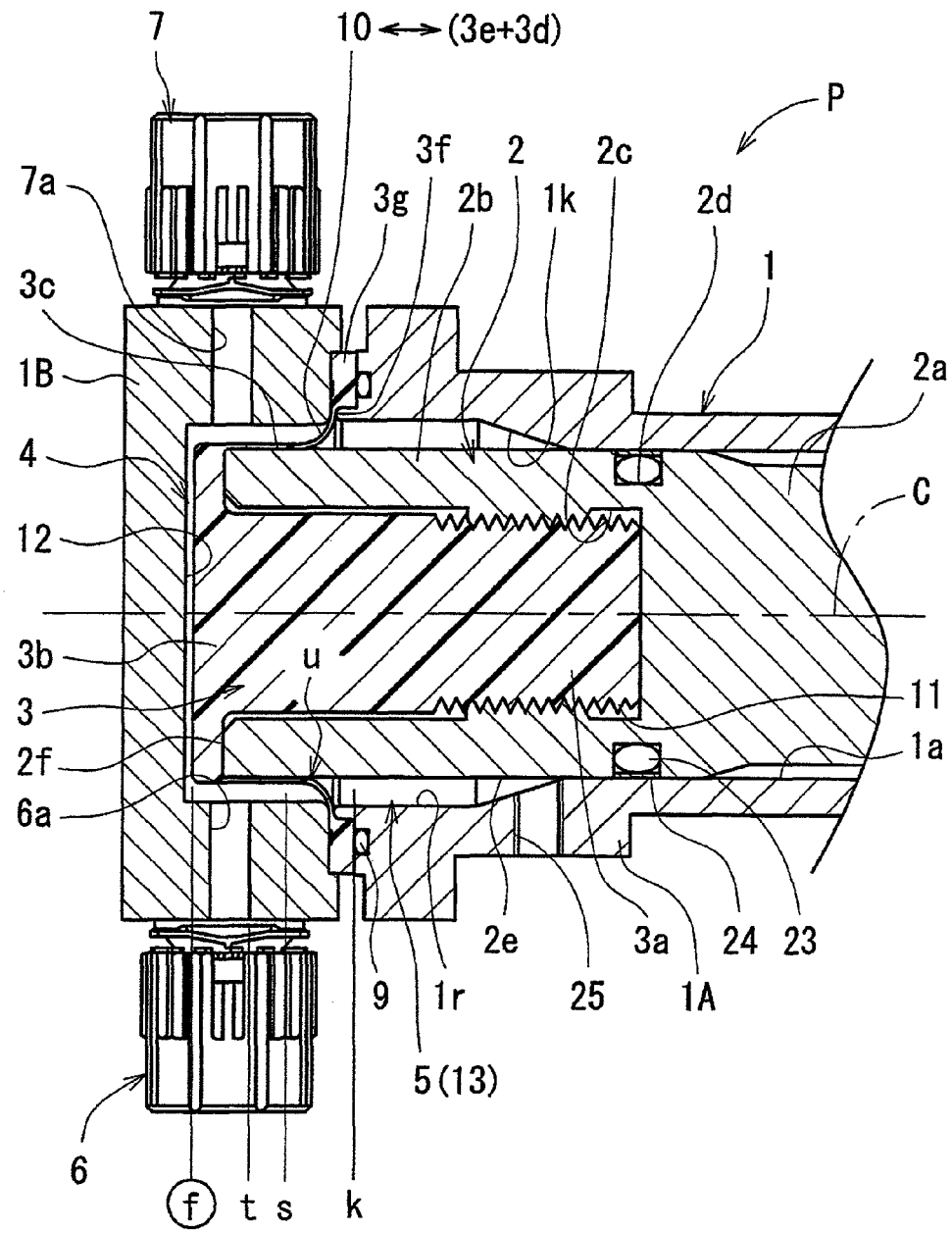
FIG. 5 is a sectional view of main portions of the pump in which the piston is at a maximum projecting position.
Figure 9A:
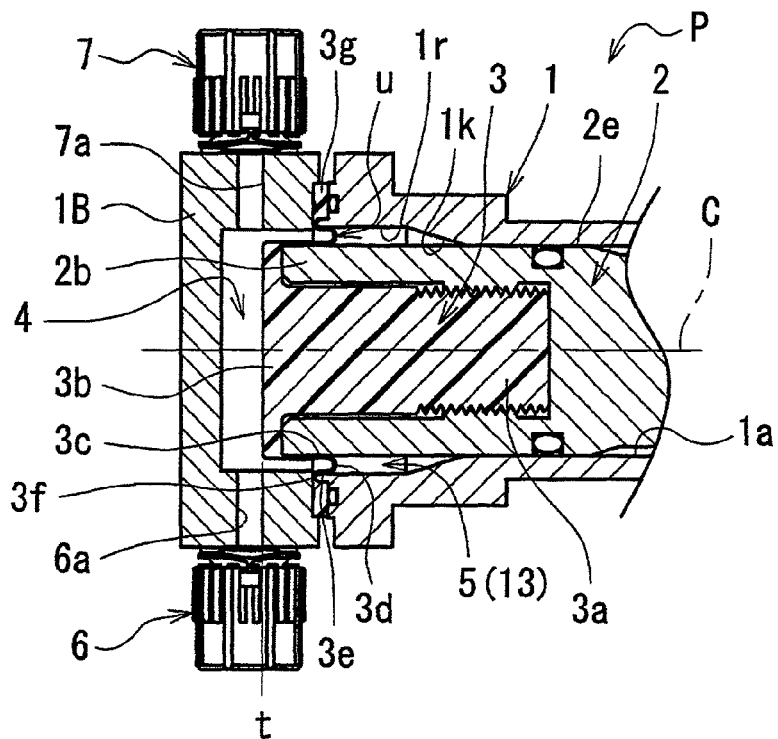
FIG. 9 shows main portions of the pump in a flushing mode, (a) is a sectional view in the case where the piston is returned to the ejection position in accordance with activation, and (b) is a sectional view in the case where an excessive ejection step is ended and the piston is at the maximum projecting position.
Figure 9B:
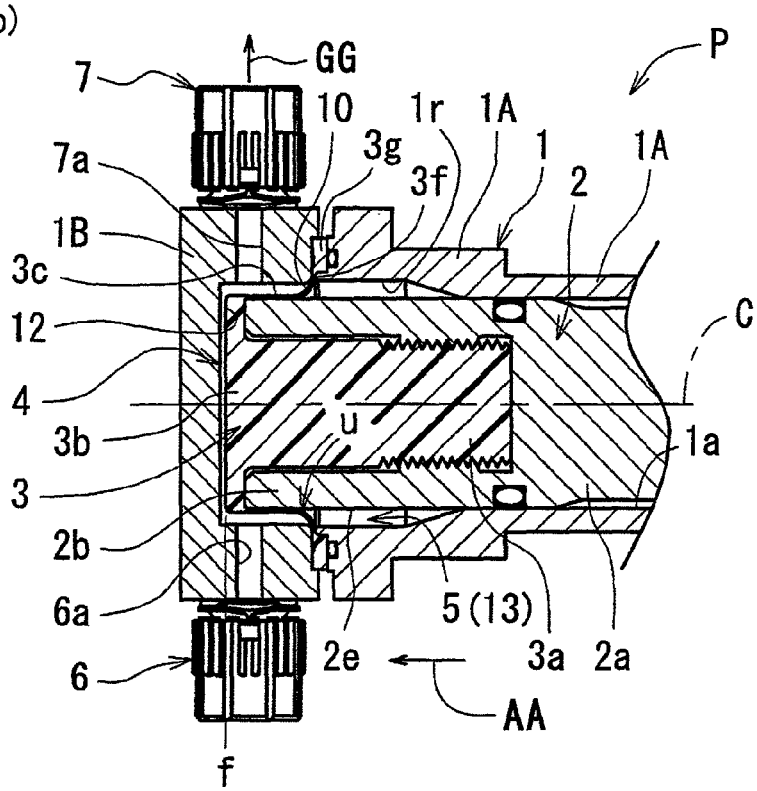
Figure 10A:
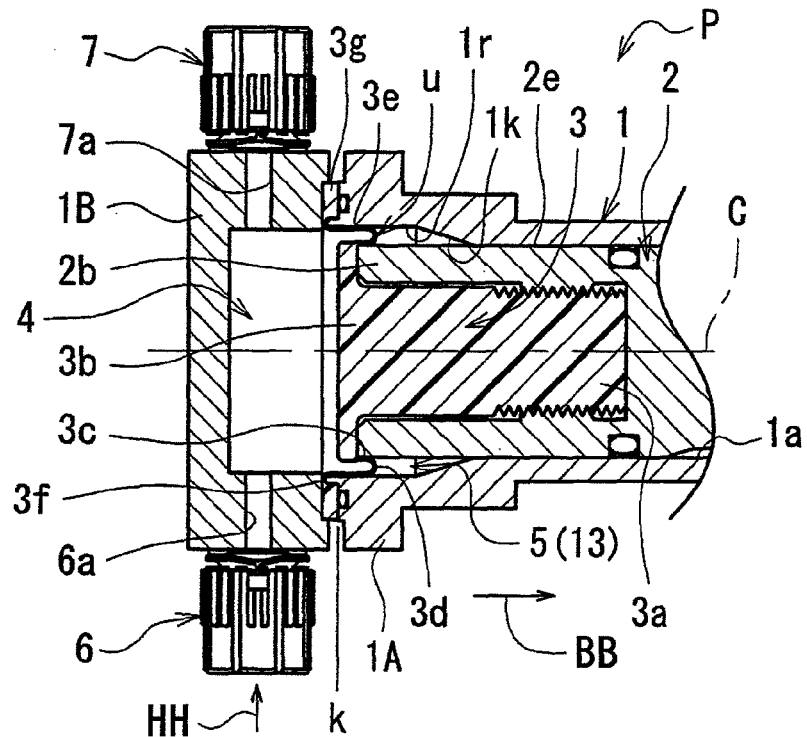
FIG. 10 shows main portions of the pump in the flushing mode, (a) is a sectional view in the case where a whole suction step is ended and the piston is at the suction position, and (b) is a sectional view in the case where a flushing step is ended and the piston is at the maximum projecting position.
Figure 10B:
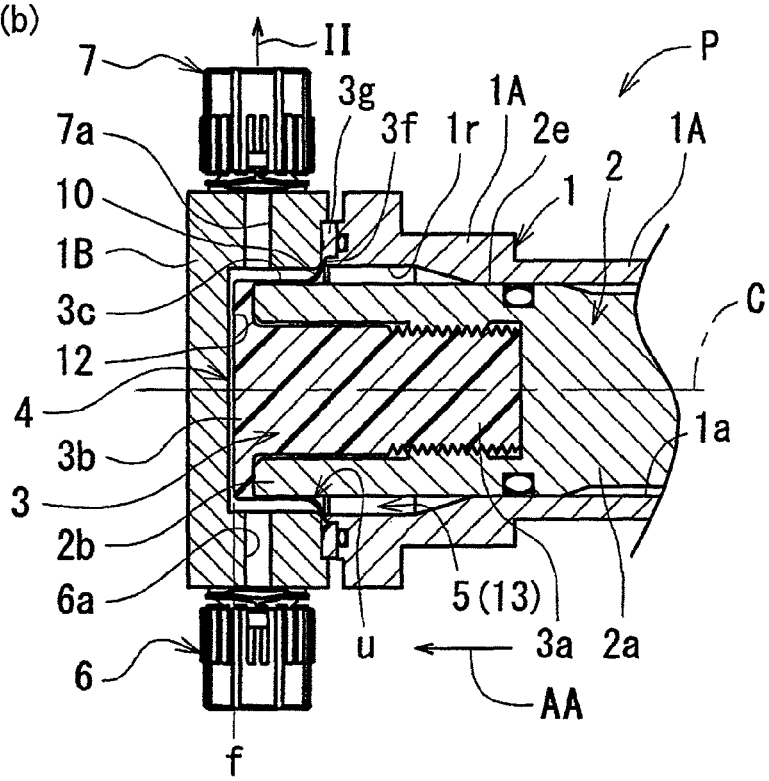

FIGS. 5, 9(b), and 10(b) show the piston 2 in the case where it is at a maximum projecting position (flushing position) f where the piston is mostly projectively moved, and it is set that the tip end of the flange head portion 3b approaches the inner surface 12 of the cylinder head 1B in a manner where it almost butts thereagainst, and the volume of the pump chamber 4 is minimum. When the piston 2 is at the maximum projecting position f, a state is obtained where the thin inner circumferential portion 3c has a longer length in the direction of the axis C (longer than that in the case of the ejection position t), the folded portion 3d and the thin outer circumferential portion 3e vanish (are not formed), and instead a curved portion 10 is formed.

The curved portion 10 is formed when the extraction portion 3f, the outer circumferential portion 3e, and the folded portion 3d [these three portions (3f, 3e, 3d) are formed when the piston 2 is at the suction position k, the ejection position t, or the like] are deformed so as to exhibit a single sectional shape by means of a curved surface which is smoothly continued from the outer circumference ring portion 3g in the direction (direction of the arrow AA) of the pump chamber 4.

That is, the rolling diaphragm 3 is deformed so that the inner circumferential portion 3c is extended in accordance with the projective movement of the piston 2, and also the position of the folded portion 3d is moved toward the pump chamber 4. When the piston 2 is projectively moved beyond the ejection position t, therefore, a state is produced where the outer circumferential portion 3e vanishes by a further movement of the folded portion 3d toward the pump chamber 4.

When the piston 2 then reaches the maximum projecting position f, the extraction portion 3f which has been in an attitude where the direction is changed by 90 deg. toward the root of the piston 2 has an attitude where it is straightly directed to the radially inner side, and the attitude of the rolling diaphragm 3 is changed to one where the curved portion 10 appears in place of the outer circumferential portion 3e and the folded portion 3d. When the piston 2 reaches the maximum projecting position f, namely, the rolling diaphragm 3 is changed from the folded attitude (see FIGS. 3 and 4) having the outer circumferential portion 3e and the folded portion 3d, to the extended attitude (see FIGS. 2 and 5) having the extraction portion 3f and curved portion 10 which are straightly directed to the radially inner side.

When the rolling diaphragm 3 is in the folded attitude, the extraction portion 3f which is formed so as to be directed to the radially inner side from the inner circumferential end of the outer circumference ring portion 3g has an attitude where the direction is changed by 90 deg., so that the inner circumferential end of the outer circumference ring portion 3g is smoothly connected to the outer circumferential portion 3e, no bent portion is formed in a thin film portion u, and the shape can be smoothly changed.

Next, a method of driving the diaphragm pump P will be described. Here, the usual driving method (usual ejection) in which a chemical liquid is sucked and ejected is referred to as the normal mode, and the driving method which is performed in replacement of liquids is referred to as the flushing mode.

[Driving Mode 1] [Normal Mode]

Figure 6A:
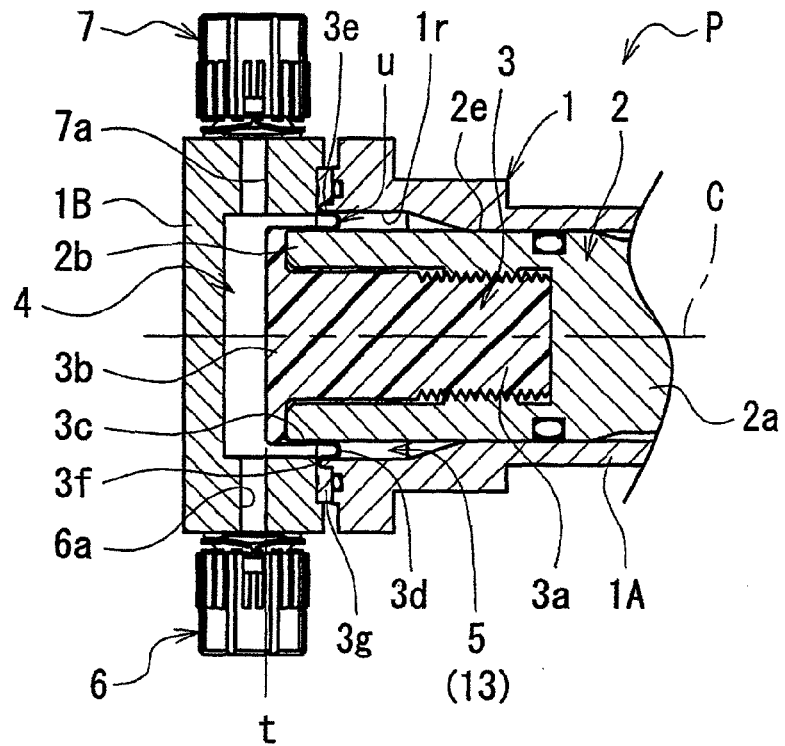
FIG. 6 shows main portions of the pump in a normal mode, (a) is a sectional view in the case where the piston is returned to the ejection position in accordance with activation, and (b) is a sectional view in the case where a suction step is ended and the piston is at the suction position.

In the normal mode, first, an origin return step of moving (or maintaining) the piston 2 to the ejection position t as shown in FIG. 6(a) is performed in response to instructions for the normal mode (including activation of the pump apparatus A, and the like).

Figure 6B:
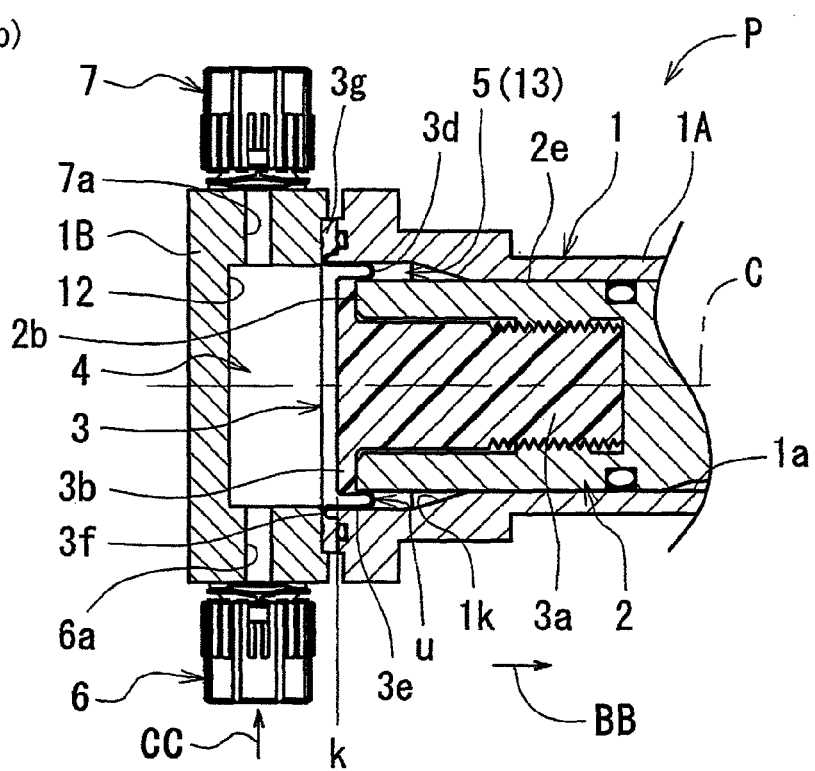

After the origin return step, a suction step of retractively moving the piston 2 to increase the volume of the pump chamber 4 is performed. FIG. 6(b) shows a state where the piston 2 is retractively moved in the direction of the arrow BB to be located at the suction position k, i.e., the end state of the suction step. At this time, the opening/closing valve 21 on the suction side is in the opened state, and the opening/closing valve 22 on the ejection side is in the closed state. As a result of the suction step, a chemical liquid is sucked into the pump chamber 4 through the suction port 6 as shown in the arrow CC.

Figure 7A:
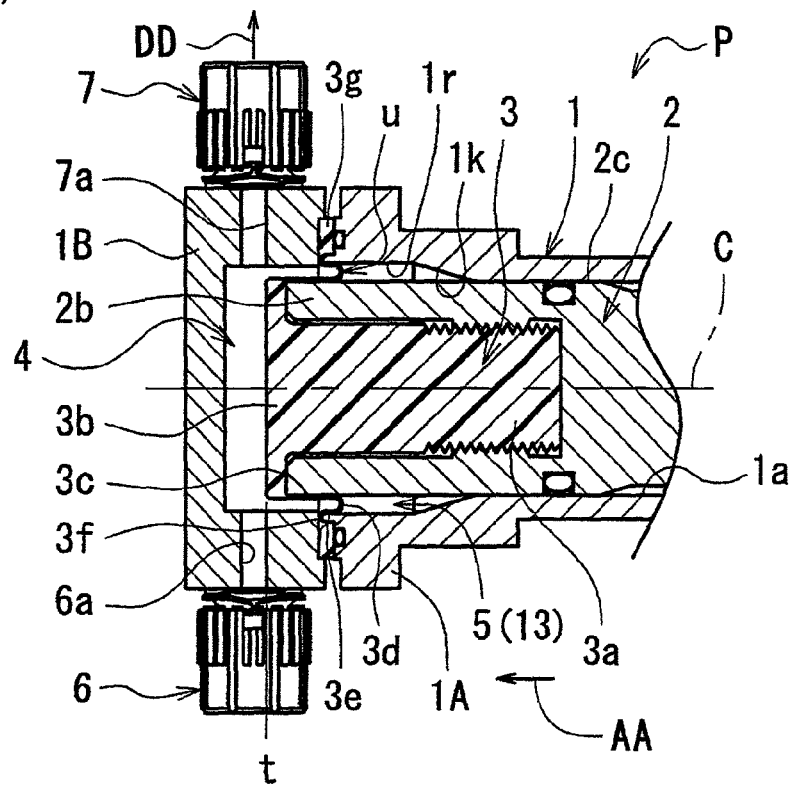
FIG. 7 shows main portions of the pump in the normal mode, (a) is a sectional view in the case where the suction step is ended and the piston is at the ejection position, and (b) is a sectional view in the case where a suck-back step is ended and the piston is at a suck-back position.

When the suction step is ended, an ejection step of projectively moving the piston 2 to reduce the volume of the pump chamber 4 is performed. FIG. 7(a) shows a state where the piston 2 is projectively moved in the direction of the arrow AA to be located at the ejection position t, i.e., the end state of the ejection step. At this time, the opening/closing valve 21 on the suction side is in the closed state, and the opening/closing valve 22 on the ejection side is in the opened state. As a result of the ejection step, the chemical liquid in the pump chamber 4 is ejected through the ejection port 7 as indicated by the arrow DD.

Figure 7B:
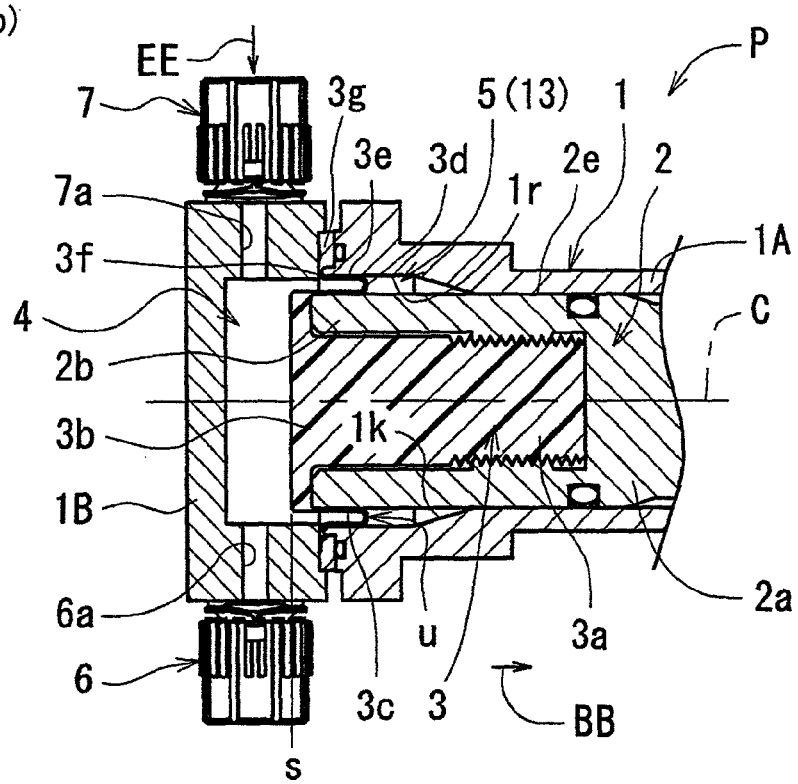

When the ejection step is ended, a suck-back step of slightly retractively moving the piston 2 which is at the ejection position t, in the direction of the arrow BB is performed. FIG. 7(b) shows a state where the piston 2 is retractively moved in the direction of the arrow BB to be located at a suck-back position s, i.e., the end state of the suck-back step. The suck-back step is a known step in which, in order to prevent the chemical liquid e from dripping from the nozzle 17 (see FIG. 12), the chemical liquid in the ejection side flow path 27 is sucked for a moment [see the arrow EE in FIG. 7(b)].

Figure 8A:
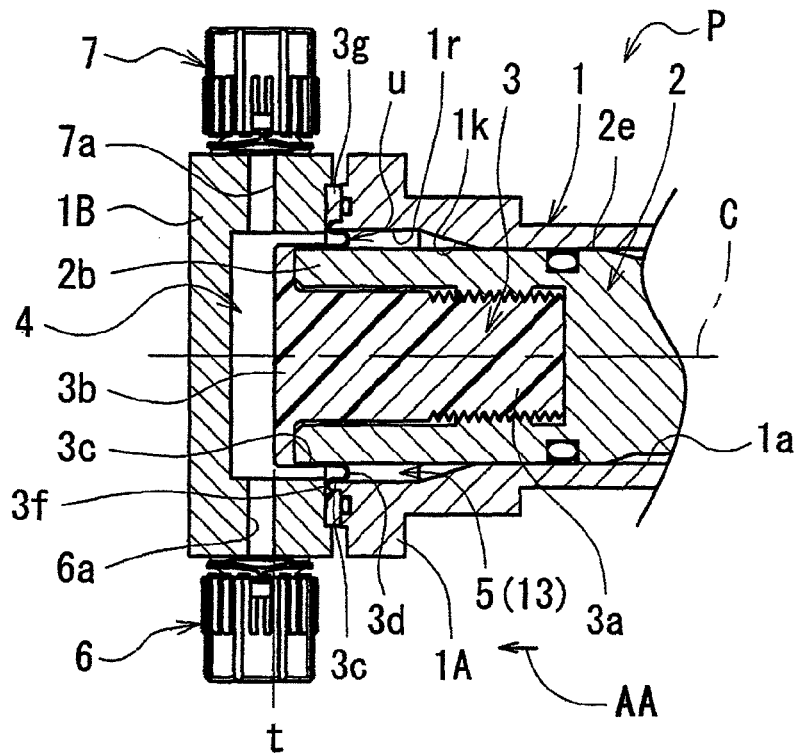
FIG. 8 shows main portions of the pump in the normal mode, (a) is a sectional view in the case where the piston is returned from the suck-back position to the ejection position, and (b) is a sectional view in the case where the suction step is ended and the piston is at the suction position.

When the suck-back step is ended, a second origin return step of projectively moving the piston 2 to return it to the ejection position t is performed. FIG. 8(a) shows the state where the piston 2 which is projectively moved from the suck-back position s is returned to the ejection position t, i.e., the end state of the second origin return step.

Figure 8B:
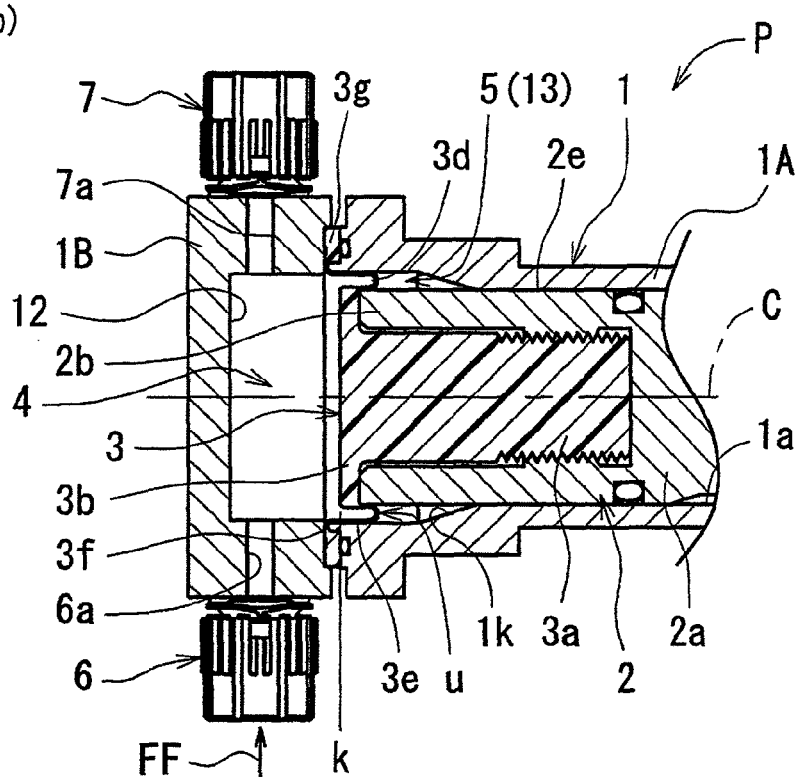

When the second origin return step is ended, the suction step of retractively moving the piston 2 to increase the volume of the pump chamber 4 is performed. In the suction step, the opening/closing valve 21 on the suction side is in the opened state, the opening/closing valve 22 on the ejection side is in the closed state, and the liquid is sucked from the suction path 6a into the pump chamber 4 [see the arrow FF in FIG. 8(b)]. FIG. 8(b) shows the end state of the suction step in which the piston 2 is retractively moved in the direction of the arrow BB to be located at the suction position k.

In the normal mode, when the process is the first one immediately after the activation, the series of operations shown in FIGS. 6(a) to 8(b), i.e., the origin return step→the suction step→the ejection step→the suck-back step→the second origin return step→the suction step are performed in this sequence. Thereafter (the second and subsequent time), the operations shown in FIGS. 7(a) to 8(b), i.e., the ejection step→the suck-back step→the second origin return step→the suction step are performed in this sequence.

When the chemical liquid is to be continued to be supplied to a wafer or the like, only a pumping operation by the suction step and the ejection step may be repeatedly performed as shown in FIGS. 6(b) and 7(a). For the sake of description of the series of operations, FIGS. 6(b) and 8(b) are separately drawn, but the figures are identical to each other.

As described above, in the suction step→the ejection step in the normal mode, the pumping operation is performed in the state where the folded attitude in which the folded portion 3d is formed in the rolling diaphragm 3 is maintained, and the sectional shape of the rolling diaphragm 3 (particularly, the film-like portion) is maintained constant. Therefore, the flow quantity of the liquid which is transferred in each of the pumping operations can be kept constant.

[Driving Mode 2] [Flushing Mode]

The flushing mode is a driving method which is performed in replacement of the liquid that is the target of pumping. In the case where a chemical liquid A to be transported by the diaphragm pump P is to be replaced with a chemical liquid B, for example, the liquid replacement is performed in the flowchart shown in FIG. 11.

First, the suction side flow path 26 is detached from the tank of the chemical liquid A. Then, "(1) Evacuation of chemical liquid A" is performed in which a pumping operation (so-called a pump idle operation) of sucking and ejecting the air is continuously executed until the chemical liquid A is almost ejected and vanishes.

In the pump idle operation, the chemical liquid A remaining in the pump chamber 4 is ejected in a spray-like form while being mixed with the air, and evacuated from the pump chamber 4.

Next, "(2) Liquid replacement to cleaning liquid A" is performed in which the suction side flow path 26 is connected to a tank of a cleaning liquid A, and the state is switched to a state where the cleaning liquid A can be introduced into the pump chamber 4.

Next, "(3) Standing after filling with cleaning liquid A" is performed in which the cleaning liquid A is sucked to fill the pump chamber 4 with the liquid, and the system stands until the cleaning liquid A fits to the portions in the pump chamber 4 (for example, for about 5 minutes).

Next, the suction side flow path 26 is detached from the tank of the cleaning liquid A. Then, "(4) Evacuation of cleaning liquid A" is performed in which a pumping operation (so-called a pump idle operation) of sucking and ejecting the air is continuously executed until the cleaning liquid A is almost ejected and vanishes.

Next, "(5) Liquid replacement to chemical liquid B" is performed in which the suction side flow path 26 is connected to a tank of the chemical liquid B, and the state is switched to a state where the chemical liquid B can be introduced into the pump chamber 4.

Next, "(6) Standing after filling with chemical liquid B" is performed in which the chemical liquid B is sucked to fill the pump chamber 4 with the liquid, and the system stands until the chemical liquid B fits to the portions in the pump chamber 4 (for example, for about 5 minutes).

After these steps, the chemical liquid A that is the target of pumping is replaced with the chemical liquid B, and then the diaphragm pump P is driven in the above-described normal mode, whereby the chemical liquid B is supplied to the wafer or the like.

Alternatively, a process of sucking and ejecting the cleaning liquid A may be performed several times between the steps of "(3) Standing after filling with cleaning liquid A" and "(4) Evacuation of cleaning liquid A" to wash away the chemical liquid A which may possibly still remain in the pump chamber 4. Further alternatively, in several drivings of the diaphragm pump P in the normal mode after replacement to the chemical liquid B, a process in which the ejected chemical liquid B is not supplied to the wafer or the like, but is discarded may be performed so as to conduct a more complete liquid replacement.

When the diaphragm pump P is driven in the above-described flushing mode, the liquid quantity and time period that are required for a liquid replacement can be reduced because of the reason described later.

In the flushing mode, the piston 2 is operated in the following manner in the steps of "(1) Evacuation of chemical liquid A" and "(4) Evacuation of cleaning liquid A".

First, the origin return step of moving (or maintaining) the piston 2 to the ejection position t as shown in FIG. 9(a) is performed in response to instructions for the flushing mode.

After the origin return step, an excessive ejection step of projectively moving the piston 2 which is at the ejection position t, to further reduce the volume of the pump chamber 4 is performed. FIG. 9(b) shows a state where the piston 2 is mostly (as far as possibly) projectively moved in the direction of the arrow AA to be located at the maximum projecting position (flushing position) f, i.e., the end state of the excessive ejection step. At this time, the opening/closing valve 21 on the suction side is in the closed state, and the opening/closing valve 22 on the ejection side is in the opened state. As a result of the excessive ejection step, most (almost all) of the chemical liquid (or the cleaning liquid) in the pump chamber 4 is ejected from the ejection port 7 as shown in the arrow GG.

After the excessive ejection step, a whole suction step of retractively moving the piston 2 which is at the maximum projecting position f, to increase the volume of the pump chamber 4 is performed. FIG. 10(a) shows a state where the piston 2 is retractively moved in the direction of the arrow BB to be located at the suction position k, i.e., the end state of the whole suction step. At this time, the opening/closing valve 21 on the suction side is in the opened state, and the opening/closing valve 22 on the ejection side is in the closed state. As a result of the whole suction step, the chemical liquid (or the cleaning liquid) is sucked from the suction port 6 into the pump chamber 4 [see the arrow HH in FIG. 10(a)]. The quantity of suction in the whole suction step is definitely larger than that in the suction step in the above-described normal mode.

After the whole suction step, a flushing step of projectively moving the piston 2 which is at the suction position k, to the maximum projecting position f to reduce the volume of the pump chamber 4 is performed. FIG. 10(b) shows a state where the piston 2 is mostly (as far as possibly) projectively moved in the direction of the arrow AA to be located at the maximum projecting position (flushing position) f, i.e., the end state of the flushing step. At this time, the opening/closing valve 21 on the suction side is in the closed state, and the opening/closing valve 22 on the ejection side is in the opened state.

In the flushing step, the pump chamber 4 in which the piston 2 is at the suction position k and the volume is maximum is reduced in one stroke in volume to have the minimum volume, by the projective movement of the piston 2 to the maximum projecting position f, and an almost all of the chemical liquid (or the cleaning liquid) with which the pump chamber 4 is filled can be discharged [see the arrow II in FIG. 10(b)].

In the steps of "(1) Evacuation of chemical liquid A" and "(4) Evacuation of cleaning liquid A" in the flushing mode, when the process is the first one immediately after the activation, the series of operations shown in FIGS. 9(a) to 10(b), i.e., the origin return step→the excessive ejection step→the whole suction step→the flushing step are performed in this sequence. Thereafter (the second and subsequent time), the operations shown in FIGS. 10(a) and 10(b), i.e., the whole suction step→the flushing step are performed in this sequence.

Next, a method of producing the rolling diaphragm 3, the detail of the reason why the conventional problem in a liquid replacement is solved, and the like will be described.

Figure 13:
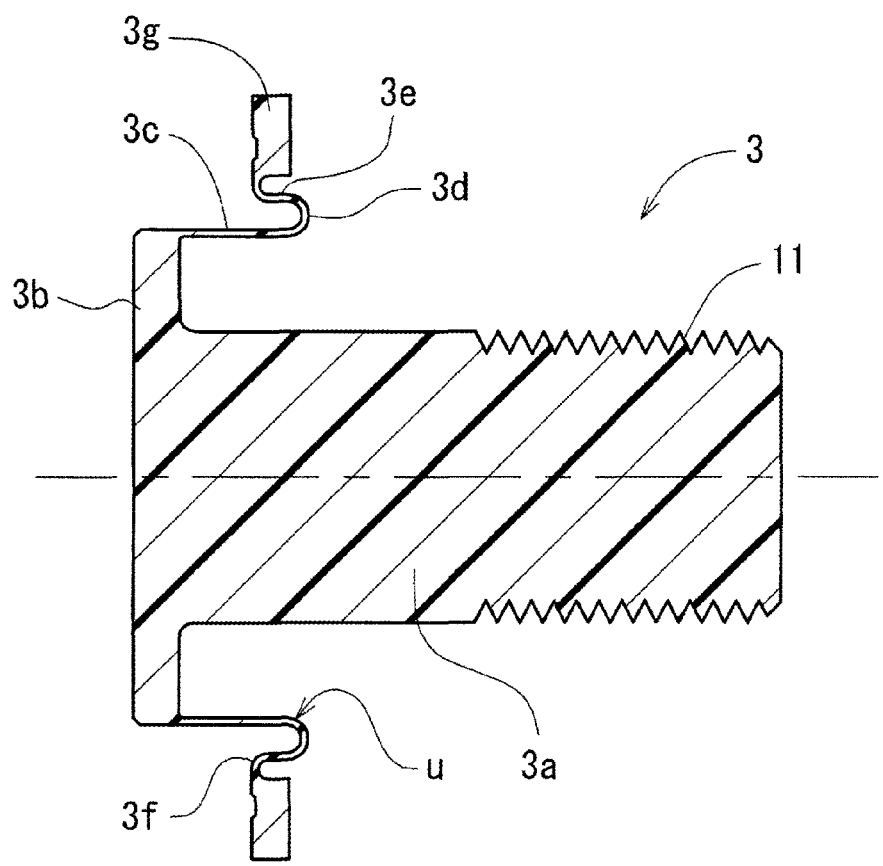
FIG. 13 is a partially cutaway side view showing a conventional rolling diaphragm in a free state.

The conventional rolling diaphragm 3 was produced in the attitude corresponding to the case where the piston 2 is for example at the ejection position t, i.e., the folded attitude in which, as shown in FIG. 13, the folded portion 3d and the outer circumferential portion 3e are formed in the thin film portion u that is a thin portion between the flange head portion 3b and the outer circumference ring portion 3g.

In this case, in the rolling diaphragm 3 made of a flexible material such as a fluorine resin, in the state where the piston 2 is reciprocally moved between the ejection position t and the suction position k, or in other words in the state where the rolling diaphragm has the folded portion 3d, the thin film portion u is smoothly deformed.

Figure 14A:
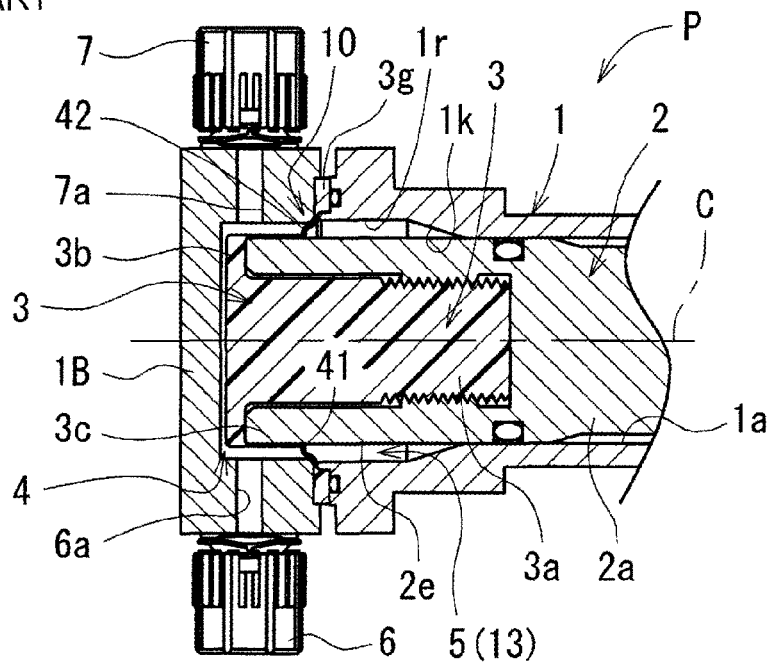
FIGS. 14(a) and 14(b) are views of main portions of pumps showing disadvantageous examples of the prior art, respectively.
Figure 14B:
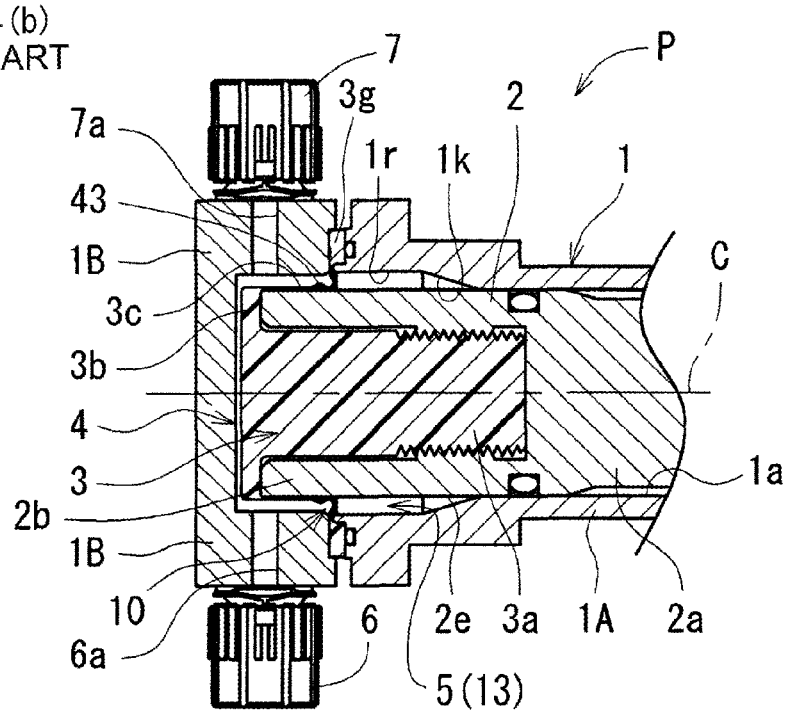

When the piston 2 is projectively moved to the maximum projecting position f, however, there arises the problem in that, as shown in FIG. 14, the edge portion 41, the reversely bent portion 42, the undulated portion 43, and the like are formed in the vicinity of the folded portion 3d which has originally existed.

The cause of the above-described problem has been intensively investigated, and it has been found that one cause of the conventional disadvantage is in the attitude in the production of the rolling diaphragm 3. Namely, it has been found that, although the conventional thin film portion u is made of a flexible material, the thin film portion has a tendency due to production (bending tendency) which causes the portion to return to the shape of the folded attitude shown in FIG. 13, and, from the influence of the tendency, the edge portion 41, the reversely bent portion 42, the undulated portion 43, and the like are formed in the vicinity of the folded portion 3d which has originally existed. Therefore, the diaphragm pump P of the invention is characterized in that the rolling diaphragm 3 is produced in the extended attitude (see FIG. 2) which is an attitude obtained when the outer circumferential portion 3e is eliminated by a projective movement of the piston 2, and the folding of the folded portion 3d is opened, and the attitude in the case where the piston 2 is at the maximum projecting position f.

In addition, the rolling diaphragm 3 is set so that, when the piston 2 is in the state (state where the piston 2 at the maximum projecting position f) where it is mostly projectively moved, the extended attitude is obtained.

Figure 2:
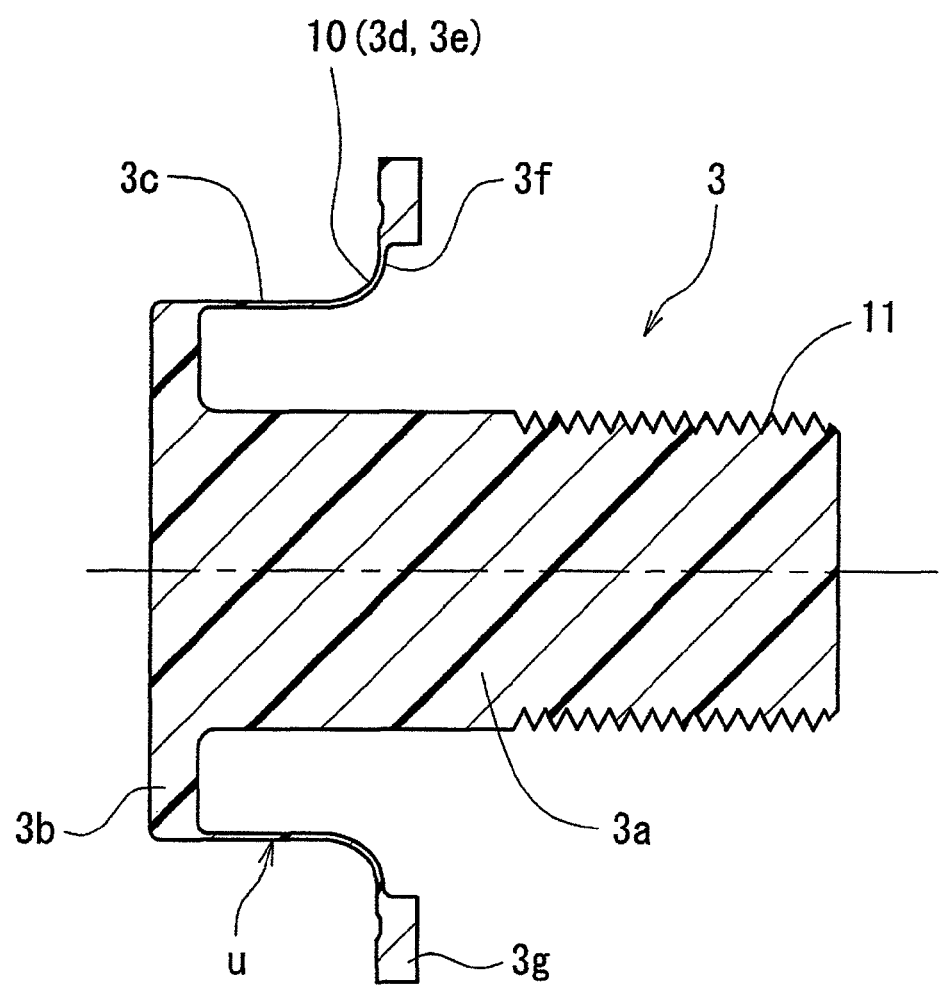
FIG. 2 is a partially cutaway side view showing a rolling diaphragm in a free state.

As described above, in the rolling diaphragm 3 which is in the extended attitude shown in FIG. 2, the folded portion 3d and the thin outer circumferential portion 3e are not formed, and instead the curved portion 10 which exhibits a gentle and smooth curved sectional shape is formed. Therefore, the rolling diaphragm 3 is produced in the state where the portion between the thin inner circumferential portion 3c and the outer circumference ring portion 3g is formed into the curved portion 10 in which the shape is smoothly changed. The reference numeral 11 denotes an external thread which is to be screwed with the piston 2.

Since the rolling diaphragm 3 is made of a flexible material such as a fluorine resin, the thin film portion u can be easily deformed into a folded shape. The reason of this is as follows. The folded attitude (see FIGS. 3 and 4) of the thin film portion u in which the folded portion 3d and the outer circumferential portion 3e appear is formed by deformation which is directed in the direction of further increasing the bending of the curved portion 10 that appears during the production. When the portion is bent in the same direction, it can be smoothly deformed.

The extended attitude shown in FIG. 2 is obtained at the one end (maximum projecting position f) of the whole moving region of the piston 2. Even when the curved portion 10 has a small tendency due to production (bending tendency), the curved portion 10 cannot be bent or deformed in a direction opposite to its bending direction, and therefore there is no possibility that a distorted sectional shape is formed by the tendency due to production.

In the diaphragm pump P of the invention having the rolling diaphragm 3 which is produced in the extended attitude (see FIGS. 2 and 5), even when the piston 2 is at any position including the suction position k, the ejection position t, and the maximum projecting position f, therefore, the thin film portion u is maintained in a state where the sectional shapes of a folded attitude, an extended attitude, and the like are smoothly deformed (changed).

Even when the piston 2 is moved to the maximum projecting position f, particularly, the rolling diaphragm 3 is obtained that has the expected extended attitude in which the thin film portion u is not formed into a distorted shape such as shown in FIG. 14, and has the curved portion 10 that is smoothly arcuately deformed. Therefore, elements (the edge portion 41, the reversely bent portion 42, the undulated portion 43, and the like) which block a liquid stagnating in the folded portion 3d from flowing in the projective movement direction are not formed, and discharging can be smoothly conducted.

In the thus improved diaphragm pump P, in the above-described flushing mode, when the piston 2 is projectively moved to the maximum projecting position f, the rolling diaphragm 3 is formed into the expected extended attitude in which the shape of the thin film portion u is smoothly changed to have the smooth curved portion 10.

As a result, it has been succeeded to provide the diaphragm pump P in which, when driven in the flushing mode, the liquid quantity and time period that are required for a liquid replacement can be reduced, and the liquid replacement efficiency is improved.

Figure 11:
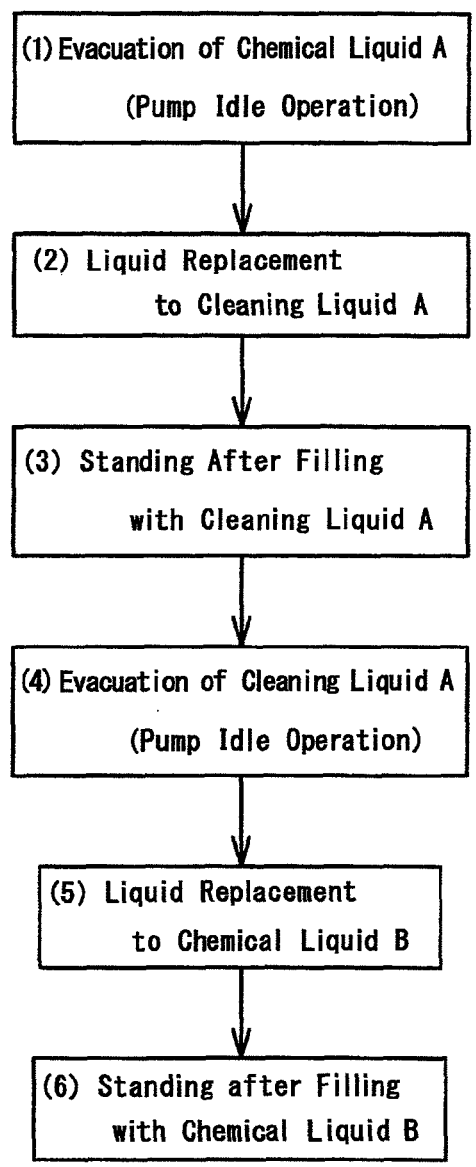
FIG. 11 is a flow chart showing the procedure of a liquid replacement in the diaphragm pump.

In the step of "(1) Evacuation of chemical liquid A" in the flowchart shown in FIG. 11, when the piston 2 is projectively moved to the maximum projecting position f, the curved portion 10 which is formed by opening of the folded portion 3d is not formed into a distorted shape. Therefore, a liquid stagnation portion is hardly formed, and the chemical liquid A is promptly evacuated from the pump chamber 4. Also in the step of "(4) Evacuation of cleaning liquid A", similarly, the cleaning liquid A is promptly evacuated from the pump chamber 4. Therefore, the liquid quantity and time period that are required for these steps can be reduced.

In the step of "(3) Standing after filling with cleaning liquid A", the shape of the curved portion 10 is a smooth shape, and therefore the chemical liquid A with which the pump chamber 4 is filled promptly fits to the curved portion 10. Also in the step of "(6) Standing after filling with chemical liquid B", similarly, the chemical liquid B with which the pump chamber 4 is filled promptly fits to the curved portion 10. Therefore, the time period for the steps can be shortened.

In a liquid replacement, consequently, the cleaning efficiency and the liquid replacement efficiency can be improved.

Other Embodiment

In Embodiment 1 described above, the ejection position t is set to the position which is moved toward the root side of the piston 2 with respect to the maximum projecting position (flushing position) f. Alternatively, the ejection position t may be set to the position same as the maximum projecting position f. That is, a configuration may be possible where, when the piston 2 reaches the ejection position t (=the maximum projecting position f), the rolling diaphragm 3 is in the extended attitude.

Also in the other embodiment, when the diaphragm pump P is driven in the normal mode, the piston 2 is reciprocally moved between the ejection position t (=the maximum projecting position f) where the piston 2 is mostly (as far as possibly) projectively moved in the direction of the arrow AA, and the suction position k. When the piston 2 is projectively moved to the ejection position t, the curved portion 10 which is formed by opening the folded portion 3d does not have a distorted shape. Therefore, a liquid stagnation portion is hardly formed, and it is possible to prevent a chemical liquid from aggregating and solidifying. Consequently, a trouble due to a liquid stagnation phenomenon in a liquid transfer can be suppressed.

In the above description, "production" has a concept including production by cutting, and production by molding (die molding).

DESCRIPTION OF REFERENCE NUMERALS 1 cylinder
1A cylinder body
1B cylinder head
1r inner circumferential surface of cylinder
2 piston
2e outer circumferential surface of piston
3 rolling diaphragm
3c inner circumferential portion
3d folded portion
3e outer circumferential portion
3f extraction portion
3g outer circumference ring portion
4 pump chamber
6a, 7a supply/ejection path
13 tubular space
f maximum projecting position
k suction position
t ejection position

The invention claimed is:

1. A diaphragm pump having: a rolling diaphragm including: an inner circumferential portion which is supported by a piston that is reciprocally movable in a cylinder, and which elongates along an outer circumferential surface of said piston; an outer circumferential portion which is supported by said cylinder, and which elongates along an inner circumferential surface of said cylinder; and a folded portion which is formed by folding back in a tubular space between said cylinder and said piston, to extend from said inner circumferential portion to said outer circumferential portion, said rolling diaphragm being made of a flexible material; and a pump chamber which is separated by said rolling diaphragm in said cylinder, and a volume of which is changed in a manner that the volume is reduced by a projective movement of said piston, and the volume is increased by a retractive movement of said piston, wherein
   said piston is configured to be reciprocally movable between a maximum projecting position where said piston is mostly projectively moved and a suction position where the retractive movement is performed from the maximum projecting position, and between the suction position and an ejection position where the retractive movement is performed from the maximum projecting position, and where the projective movement is performed from the suction position,
   said rolling diaphragm is produced in an extended attitude corresponding to an attitude obtained when, by a projective movement of said piston, said outer circumferential portion is eliminated, and a folding of said folded portion is opened, and
   said rolling diaphragm is set to a state in which, when said piston is at the maximum projecting position, the extended attitude is obtained, and when said piston is at the ejection position and on a side of the suction position with respect to the ejection position, said rolling diaphragm is maintained in a folded attitude having said folded portion.

2. The diaphragm pump according to claim 1, wherein said cylinder has: a cylinder body in which said piston is accommodated in a reciprocally movable manner; and a cylinder head including supply/ejection paths for said pump chamber, said rolling diaphragm includes a thick outer circumference ring portion which is continuous with a tip end side of said outer circumferential portion, and
   said cylinder body and said cylinder head are coupled and integrated with each other while interposing said outer circumference ring portion between said both components.

3. The diaphragm pump according to claim 1, wherein said rolling diaphragm has a configuration where a thin-film annular extraction portion which extends in an inner radial direction from an inner circumferential end of said outer circumference ring portion is connected to said outer circumferential portion.

* * * * *